Feb. 14, 1933.  E. H. BOBO  1,897,109
FISH LURE
Filed March 28, 1932
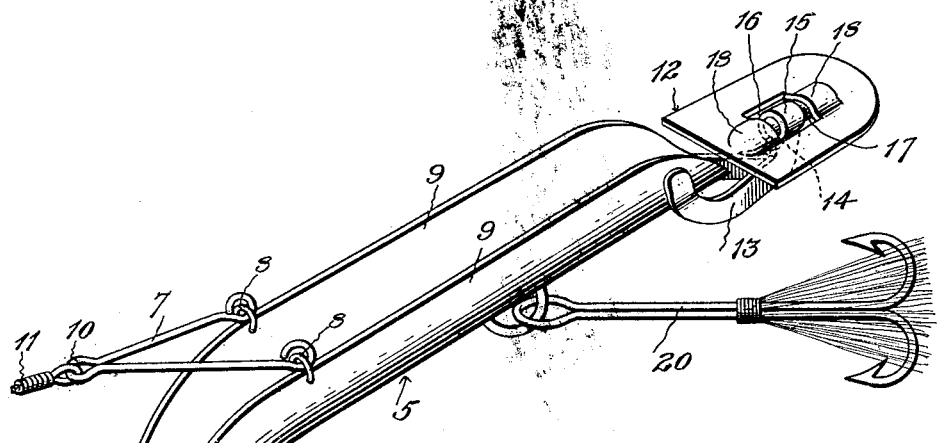
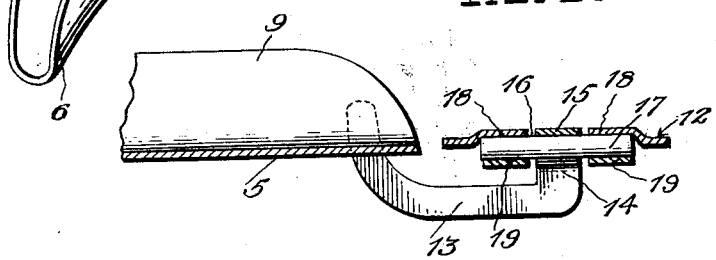
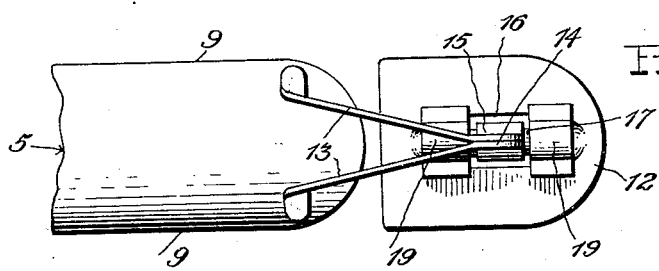
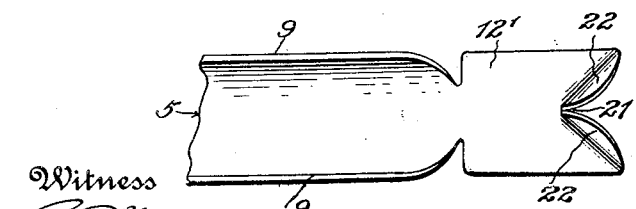
Inventor
Edward H. Bobo
Witness
By H. B. Willson &Co.
Attorneys.

Patented Feb. 14, 1933

1,897,109

UNITED STATES PATENT OFFICE

EDWARD H. BOBO, OF RANGER, TEXAS

FISH LURE

Application filed March 28, 1932. Serial No. 601,655.

The invention aims to provide a new and improved fish lure for trolling purposes and of such construction as to move in unusual ways as it is being drawn through the water.

A further object is to provide a lure which may be easily and inexpensively manufactured and marketed and hence sold at small cost.

With the foregoing in view, the invention resides in the novel subject matter hereinafter described and claimed, description being accomplished by reference to the accompanying drawing.

Fig. 1 is a perspective view showing the preferred construction.

Fig. 2 is a detail central longitudinal sectional view.

Fig. 3 is a fragmentary bottom plan view.

Fig. 4 is a fragmentary top plan view showing a modified construction.

While features of construction have been illustrated which have proven to be advantageous, variations may of course be made within the scope of the invention as claimed.

The numeral 5 on the drawing denotes an elongated longitudinally channeled body formed of thin sheet metal or other light material, said body having its channeled side presented upwardly, being open at its front end, and being likewise open at its rear end. The front end 6 is curved or otherwise turned downwardly to cause the lure to dip and take to the water rather than skim the surface.

A line-attaching bail 7 has its ends loosely pivoted at 8 to the opposed side walls 9 of the body 5, at points spaced well rearward from the front extremity of said body and relatively near the longitudinal center of said body, the pivots 8 permitting swinging of the body 5 on an axis transverse to its length. In the construction shown, the bail 7 is provided with a central eye 10 to which the line 11 is connected in any desired way.

In Figs. 1, 2 and 3, a flipper 12 is disposed at the rear end of the body 5 and is pivotally mounted on an axis extending longitudinally of said body, said flipper having limited pivotal movement in both directions about its pivotal axis. In the construction shown, a bifurcated flipper support 13 is secured at its front ends to the lower portion of the body 5 and projects rearwardly from said body under the flipper 12, the rear end of said support being provided with an upstanding portion 14 having a tubular bearing 15. This bearing is received in an opening 16 in the flipper 12, and a pivot pin 17 passes through said bearing and projects both forwardly and rearwardly therefrom. The flipper 12 is provided with upwardly stamped bearing portions 18 which engage the upper sides of the projecting pin portions, and suitable bearing caps 19 are soldered or otherwise secured to the lower side of said flipper 12 and engage the lower side of said projecting pin portions. The flipper is thus loosely pivoted in an inexpensive, yet efficient way, and in the preferred construction, the plane of said flipper is preferably above the axis of the pin 17, so that the former is very sensitive to unbalanced pressures on its upper side, at opposite sides of its pivot. Its pivotal movement however, is limited by striking against one or the other of the furcations of the support 13.

The body 5 may carry any desired hook or hooks, such as illustrated at 20, each hook being preferably although not necessarily loosely pivoted to the body.

The operation of the lure will now be described, and in following the explanation, it will be well to bear in mind the changes in names of the different parts, taking place after the nose 6 has dipped and the lure has begun to operate. The nose 6, at the front in the drawing becomes the lower end. The tail of the lure becomes the upper end, the open top becomes the front, and the bottom becomes the back, while the right and left sides each in turn become the top and bottom sides. It will be observed that there are two pivots whose planes of action are at right angles to each other and that the forces set up about these pivots (8 and 17) lie in planes at right angles to each other. The explanation of these forces will be treated separately in order that their combined actions may be more readily understood, and the first discussion will concern movement of the body 5 about the pivots 8.

Simultaneously with the beginning of the retrieve, the nose 6 dips and consequently tilts the lure about the pivots 8, and said lure quickly assumes a position but slightly short of being perpendicular to the fishing line by which it is being pulled. This body 5 seeks and maintains a balanced condition about the pivots 8 and will substantially maintain said position throughout the entire retrieve, but due to the fact that the pivot is slightly raised with reference to the channel, or in other words, the plane upon which the forces act, the resultant of these forces will be slightly oblique to the fishing line and to the line of retrieve, thus causing a slippage of the lure away from this line and always in the direction of the nose 6, no matter what direction this may be, whether up, down, right, or left. The flipper 12 controls this direction within certain bounds.

In explaining the action of the flipper 12, I will for the time being consider said flipper apart from all else and will assume that the line is secured to the center of the pivot pin 17, that this pivot pin is standing horizontally at right angles to the line, and that the flipper is in a vertical plane perpendicular to said line. In other words, the flipper will be standing on edge facing the operator, with symmetrical halves above and below the line. I will now assume that the flipper and the line are immersed a suitable depth and that the line is pulled or retrieved. As the retrieve is started and progresses, the dynamic force set up on the lower half of the flipper 12 is greater than that upon the upper half, thus causing this lower half to lag and the upper half to lead, which if stopped before a quarter of a turn has been made by the flipper, will give rise to an elevating force which in turn will cause the flipper to rise toward the surface of the water, as does a water sled. It must be remembered that during this example, the rise toward the surface has taken place with the axis of the pivot pin in a horizontal plane at all times and that the lower half of the flipper has had at all times a greater force acting upon it. By pivoting the flipper 12 to the body of the lure, a different condition arises, for if we consider the lure to be upon its side, the flipper will be in the same position as at the beginning of said example, but the lifting moment of said flipper will cause the lure to spin about the line as an axis. At the end of a quarter spin, the lure is standing on its nose and the axis of the pin 17 is perpendicular. At this point, the pressure on the opposite halves of the flipper 12, is balanced. Any further spin would cause a reversal of the top and bottom sides of the flipper, a reversal of pressure distribution, and a reversal of swing of the flipper and finally a reversal of spin of the lure. Such reversals repeatedly take place during operation of the lure, but each reversal is delayed somewhat by placing the plane of the flipper 12 slightly in advance of the axis about which said flipper may turn.

Due to the forces and movements above explained, a retrieve is obtained which may be described as consisting of a series of half spirals. The acting forces give rise to movements very similar to those of the ordinary kite, and most especially is this true with respect to the nose-ward movement of the body 5. It would appear that the constant lifting moment due to the flipper, would eventually bring the lure to the surface of the water, but this moment is opposed by the body 5 slipping downward or diving, since the nose in general is in a downward direction.

In the modified construction shown in Fig. 4, a flipper or tail 12' disposed substantially in a horizontal plane, extending longitudinally of the body 5, is provided, said flipper or tail being either integrally joined to said body or otherwise rigidly connected thereto. The rear end of the tail-piece 12' is provided with a V-shaped notch, and at the edges of this notch, is formed with rearwardly diverging vanes 22 which project upwardly at approximately 90° to the plane of the flipper or tail.

While the construction shown in Fig. 4 will not perform as effectively as the first described construction, it may be made to closely simulate the action of said first described form, by slightly manipulating the rod and reel.

With the exception of the above described features 12', 21 and 22, the device of Fig. 4 is the same as that shown in the preceding views.

I claim :—

1. A fish lure comprising an elongated longitudinally channeled hook-carrying body having its open side disposed upwardly, and a line-attaching bail having its ends loosely pivoted to the opposite side walls of said body in rearwardly spaced relation with the front end of the latter.

2. A fish lure comprising an elongated longitudinally channeled body open at its front and rear ends and having its open side disposed upwardly, the front portion of said body being declined with respect to the remainder of said body, and a line-attaching bail having its ends loosely pivoted to the opposite side walls of said body in rearwardly spaced relation with the front end of the latter.

3. A fish lure comprising an elongated hook-carrying body and having line-attachmeans between its ends, means at the front end of said body for causing said end to dive, and means on the rear end of said body for causing turning of said body about the line.

4. A fish lure comprising an elongated hook-carrying body having line-attaching means between its ends, means at the front end of said body for causing said end to dive, a pivoted flipper on the rear end of said body for causing turning of the body about the line, said flipper being mounted on an axis extending longitudinally of the body, and means for limiting the pivotal movement of said flipper in both directions about its axis.

5. A fish lure comprising an elongated longitudinally channeled body open at its front and rear ends, a line-attaching bail having its ends loosely pivoted to the opposite side walls of said body in rearwardly spaced relation with the front end of the latter, a flipper at the rear end of said body, means pivotally mounting said flipper on an axis extending longitudinally of the latter, said flipper extending equi-distantly at opposite sides of said axis, and means for limiting pivotal movement of said flipper in both directions about its axis.

6. A fish lure comprising an elongated longitudinally channeled body open at its front and rear ends and having its open side disposed upwardly, a line-attaching bail having its ends loosely pivoted to the opposite side walls of said body in rearwardly spaced relation with the front end of the latter, a flipper at the rear end of said body, a flipper support projecting rigidly rearward from said body, and means pivotally mounting said flipper on said support on an axis extending longitudinally of said body, said support being positioned to be struck by said flipper to limit pivotal movement of the latter in both directions about its axis.

7. A fish lure comprising an elongated longitudinally channeled body open at its front and rear ends and having its open side disposed upwardly, the front portion of said body being declined with respect to the remainder of said body, a line-attaching bail having its ends loosely pivoted to the opposite side walls of said body in rearwardly spaced relation with the front end of the latter, a flipper at the rear end of said body, means pivotally mounting said flipper on an axis extending longitudinally of the latter, said flipper extending equi-distantly at opposite sides of said axis, and means for limiting pivotal movement of said flipper in both directions about its axis.

8. A fish lure comprising an elongated longitudinally channeled body open at its front and rear ends and having its open side disposed upwardly, the front portion of said body being declined with respect to the remainder of said body, a line-attaching bail having its ends loosely pivoted to the opposite side walls of said body in rearwardly spaced relation with the front end of the latter, a flipper at the rear end of said body, a flipper support projecting rigidly rearward from said body, and means pivotally mounting said flipper on said support on an axis extending longitudinally of said body, said support being positioned to be struck by said flipper to limit pivotal movement of the latter in both directions about its axis.

9. A fish lure comprising an elongated longitudinally channeled body open at its front and rear ends and having its open side disposed upwardly, the front portion of said body being declined with respect to the remainder of said body, a line-attaching bail having its ends loosely pivoted to the opposite sides of said body in rearwardly spaced relation with the front end of said body, a tail projecting rigidly rearward from said body and disposed in a substantially horizontal plane extending longitudinally of said body, said tail having two upstanding rearwardly diverging vanes.

In testimony whereof I affix my signature.
EDWARD H. BOBO.